(12) United States Patent
Kufeldt et al.

(10) Patent No.: US 10,338,648 B2
(45) Date of Patent: Jul. 2, 2019

(54) KEY-VALUE DRIVE ULTRATHIN SATA CONNECTOR

(71) Applicant: Toshiba Memory Corporation, Tokyo (JP)

(72) Inventors: Philip A. Kufeldt, San Jose, CA (US); Rodney B. Ngai, Sunnyvale, CA (US)

(73) Assignee: Toshiba Memory Corporation, Tokyo (JP)

( * ) Notice: Subject to any disclaimer, the term of this patent is extended or adjusted under 35 U.S.C. 154(b) by 67 days.

(21) Appl. No.: 14/553,977

(22) Filed: Nov. 25, 2014

(65) Prior Publication Data

US 2016/0149326 A1 May 26, 2016

(51) Int. Cl.
*H01R 12/77* (2011.01)
*G06F 1/18* (2006.01)
*H01R 27/02* (2006.01)
*H01R 12/70* (2011.01)
*H01R 13/24* (2006.01)

(52) U.S. Cl.
CPC .............. *G06F 1/188* (2013.01); *G06F 1/187* (2013.01); *H01R 12/778* (2013.01); *H01R 12/7005* (2013.01); *H01R 13/2407* (2013.01)

(58) Field of Classification Search
CPC ......... Y10T 29/49147; Y10T 29/49002; Y10T 29/49222; H01R 12/7082; H01R 31/06; H01R 12/716; H01R 12/722; H01R 12/777; H01R 27/02; H05K 2201/10189; H05K 1/117; H05K 7/1053; H05K 3/301
See application file for complete search history.

(56) References Cited

U.S. PATENT DOCUMENTS

| | | | | |
|---|---|---|---|---|
| 4,722,691 A * | 2/1988 | Gladd | .................. | H01R 12/716 439/247 |
| 4,874,333 A * | 10/1989 | Reed | ...................... | H01R 24/62 439/188 |
| 5,002,494 A * | 3/1991 | Olsson | ................... | H01R 12/83 439/326 |
| 5,507,651 A * | 4/1996 | Tanaka | ................... | H01R 12/62 439/632 |
| 5,688,143 A * | 11/1997 | McHugh | ................ | H01R 12/79 439/495 |
| 5,803,761 A * | 9/1998 | Mochizuki | ............. | H01R 12/83 439/326 |
| 6,210,209 B1 * | 4/2001 | Wu | ........................ | H01R 12/79 439/495 |
| 6,315,621 B1 * | 11/2001 | Natori | ................ | H01R 13/2428 439/862 |
| 6,764,315 B2 * | 7/2004 | Ng | ........................ | H01R 12/714 439/66 |

(Continued)

*Primary Examiner* — James Wu
*Assistant Examiner* — Michael A Matey
(74) *Attorney, Agent, or Firm* — Kim & Stewart LLP

(57) ABSTRACT

A low-profile electrical connector that can be coupled to an electronic device without significantly increasing the effective size of the electronic device. When coupled to a compatible mating connector on the electronic device, the electrical connector does not extend significantly beyond the footprint of the electronic device or increase the thickness of the electronic device. Conductors in the electrical connector that electrically couple to contacts in the mating connector are routed to exit the electrical connector on a different side than the side opposite the mating connector.

12 Claims, 9 Drawing Sheets

(56) References Cited

U.S. PATENT DOCUMENTS

| | | | | |
|---|---|---|---|---|
| 6,881,085 B2* | 4/2005 | Yahiro | H01R 12/721 | 439/326 |
| 7,357,663 B2* | 4/2008 | Wei | H01R 12/79 | 439/260 |
| D596,129 S * | 7/2009 | Huang | D13/147 | |
| 7,878,829 B2* | 2/2011 | Yang | H01R 13/6315 | 439/247 |
| 8,102,673 B2* | 1/2012 | Chen | H01R 12/716 | 361/807 |
| 8,616,900 B1* | 12/2013 | Lion | G11B 25/043 | 439/76.1 |
| 8,882,524 B2* | 11/2014 | Golko | H01R 13/6273 | 439/218 |
| 8,951,070 B1* | 2/2015 | Goodwin | H01R 12/721 | 439/660 |
| 2001/0049210 A1* | 12/2001 | Pinteric | G11B 33/122 | 439/76.1 |
| 2004/0177219 A1* | 9/2004 | Meehan | G06F 1/187 | 711/114 |
| 2008/0003862 A1* | 1/2008 | Yuan | H01R 13/2442 | 439/350 |
| 2008/0076298 A1* | 3/2008 | Matsumura | H01R 31/06 | 439/584 |
| 2008/0146047 A1* | 6/2008 | Tan | H01R 13/518 | 439/61 |
| 2009/0221165 A1* | 9/2009 | Buck | H01R 13/514 | 439/108 |
| 2009/0273896 A1* | 11/2009 | Walker | G06F 1/187 | 361/679.33 |
| 2010/0062659 A1* | 3/2010 | Yang | H01R 13/6315 | 439/752 |
| 2010/0075536 A1* | 3/2010 | Kubo | H01R 13/6315 | 439/620.21 |
| 2010/0120283 A1* | 5/2010 | Yang | H01R 13/2442 | 439/357 |
| 2011/0034084 A1* | 2/2011 | Hsueh | H01R 9/03 | 439/630 |
| 2011/0223811 A1* | 9/2011 | Hsueh | H01R 9/03 | 439/629 |
| 2012/0077385 A1* | 3/2012 | Qiao | H01R 27/02 | 439/628 |
| 2012/0156909 A1* | 6/2012 | Tyler | H01R 13/112 | 439/259 |
| 2012/0258620 A1* | 10/2012 | Kajiura | H01R 12/77 | 439/329 |
| 2013/0095702 A1* | 4/2013 | Golko | H01R 13/6273 | 439/676 |
| 2013/0217253 A1* | 8/2013 | Golko | H01R 13/516 | 439/345 |
| 2015/0024636 A1* | 1/2015 | Tsai | H01R 12/716 | 439/630 |
| 2016/0055115 A1* | 2/2016 | Fu | G06F 13/409 | 710/301 |

* cited by examiner

KEY-VALUE DRIVE ULTRATHIN SATA CONNECTOR

BACKGROUND

Standardized electrical connectors are generally used for relaying data and power between electronic devices, and may be configured to be compatible with multiple devices for flexibility. For example, serial advanced technology attachment (SATA) is a computer bus interface for connecting a computer system, a motherboard, or a circuit board to a mass storage device, such as a hard disk drive or an optical drive. The SATA standard includes a male connector mounted on the mass storage device and a female connector coupled to a SATA cable. Given the industry-wide use of these standardized connectors, the same SATA cable can be used to route power and signals to any of a variety of different mass storage devices, even when made by different manufacturers.

However, one drawback of standardized electrical connectors is the constrained geometry associated with such connectors. As the miniaturization of electronic devices continues, the dimensions of the standardized connectors that relay data and power to these devices remain the same. Consequently, a standardized electrical connector, while configured to be mechanically compatible with a reduced size electronic device, may be over-sized for the application of the electronic device, causing mechanical interferences with other devices and/or increasing the effective size of the electronic device to which the electrical connector is coupled. Accordingly, there is a need in the art for a standardized electrical connector that does not increase the effective size of an electronic device coupled thereto.

SUMMARY

One or more embodiments provide a low-profile electrical connector that can be coupled to an electronic device without significantly increasing the effective size of the electronic device. According to the embodiments, the electrical connector may be configured so that, when coupled to a compatible mating connector on the electronic device, the electrical connector does not extend significantly beyond the footprint of the electronic device or increase the thickness of the electronic device. Specifically, conductors in the electrical connector that electrically couple to contacts in the mating connector do not exit the electrical connector on a side opposite that of the mating connector. Instead, the conductors are routed to exit the electrical connector on a different side than the side opposite the mating connector. When the conductors in the electrical connector are routed in this manner, the electrical connector does not significantly extend beyond the footprint of an electronic device or otherwise increase the size of the device when coupled thereto.

A SATA connector according to an embodiment includes a plurality of elongated conductors, each having a first end for connecting with a corresponding contact of a mating SATA connector, a second end, and a body portion connecting the first end and the second end and configured to maintain physical contact between the first end and the corresponding contact of the mating SATA connector, wherein the body portion has a bend of at least about 90 degrees.

A SATA connector according to another embodiment includes a first side that comprises a side of the SATA connector that faces a mating SATA connector when the SATA connector is coupled to the mating SATA connector, a second side that is opposite the first side, and a plurality of elongated conductors, each having a first end disposed between the first and second sides and a second end terminating at a point that is between the first and second sides or is closer to the first side than to the second side.

A data storage device according to an embodiment includes a 3.5-inch form factor disk drive enclosure, a first 2.5-inch form factor disk drive mounted on a support surface inside the 3.5-inch form factor disk drive enclosure and coupled to a printed circuit board via a first SATA connector, and a second 2.5-inch form factor disk drive mounted on the support surface and coupled to the printed circuit board via a second SATA connector.

DETAILED DESCRIPTION

Figure 1:
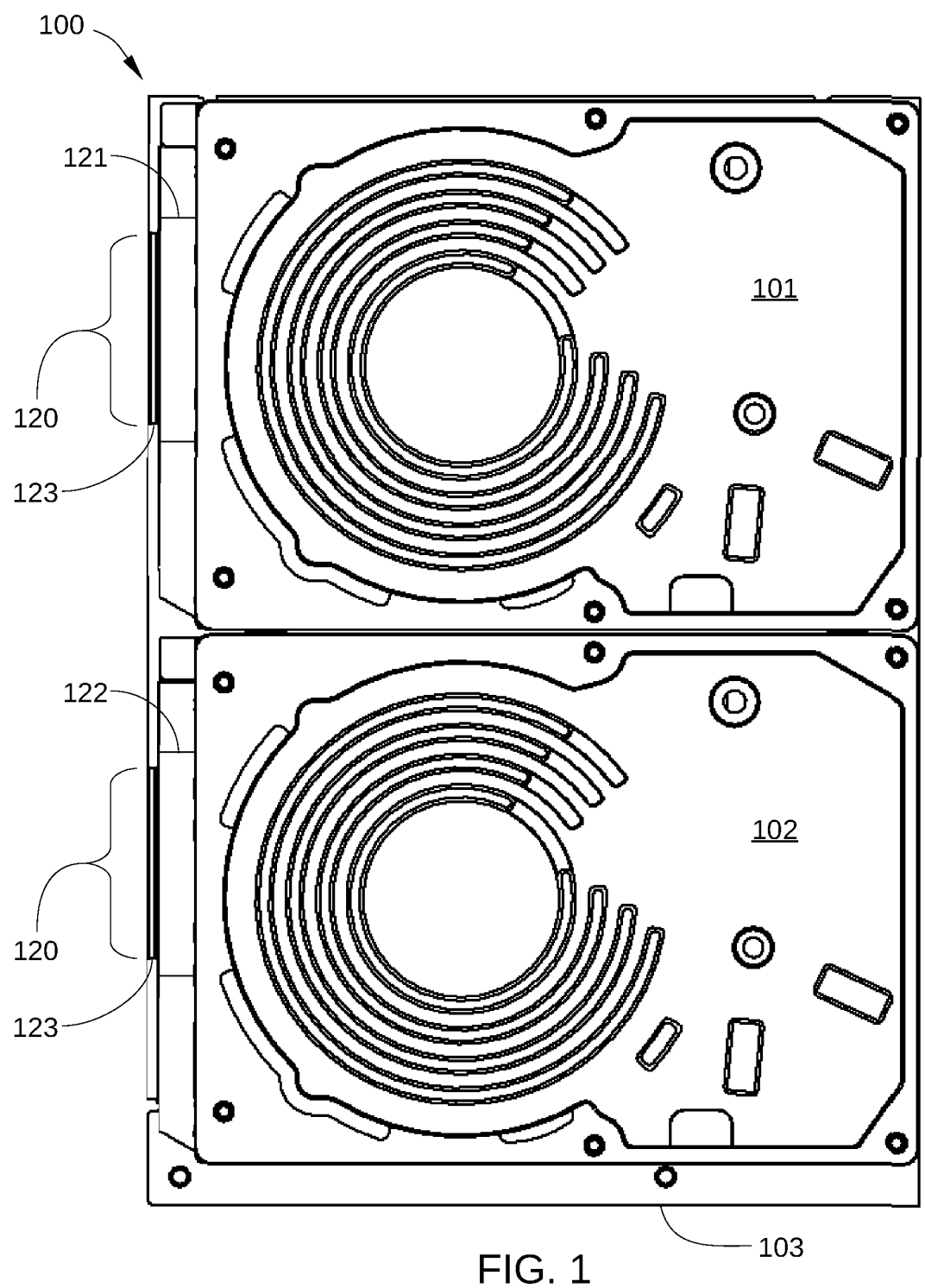
FIG. 1 schematically illustrates a mass storage device that includes electrical connectors configured according to one or more embodiments.

FIG. 1 schematically illustrates a mass storage device 100 that includes electrical connectors 120 configured according to one embodiment. Mass storage device 100 includes a first hard disk drive (HDD) 101 and a second HDD 102, which are mounted adjacent to each other on a support structure 103. Support structure 103 may be formed from a metallic or polymer plate, a printed circuit board (PCB), and/or a fully or partially enclosed housing, such as a disk drive enclosure. Electrical connectors 120 are configured to mate with a SATA receptacle 121 on first HDD 101 and a SATA receptacle 122 on second HDD 102. In FIG. 1, electrical connectors 120 are shown coupled to SATA receptacle 121 and SATA receptacle 122. Therefore, only an external portion 123 of each electrical connector 120 extends out of SATA receptacle 121 and SATA receptacle 122 and is visible in FIG. 1.

Here, first HDD 101 and second HDD 102 are each 2.5-inch form factor HDDs. In contrast, support structure 103 has a footprint that conforms to the form factor of a 3.5-inch form factor HDD. In this context, the "footprint" of support structure 103 refers to the total area of support structure 103 visible in plan view and bounded by the outer dimensions of support structure 103, i.e., the area contained within the extents of the outer dimensions of support structure 103. Because support structure 103 provides very little clearance around first HDD 101 and second HDD 102, external portion 123 of electrical connector 120 is configured to extend beyond the footprint of first HDD 101 and second HDD 102 by a very small distance, for example no greater than that sufficient to provide an extraction feature for facilitating removal of electrical connector 120 from mating SATA receptacle 121 or SATA receptacle 122. The relationship between the footprint of support structure 103, the footprints of first HDD 101 and second HDD 102, and the available space for external portion 123 of electrical connectors 120 is shown more clearly in FIG. 2.

Figure 2:
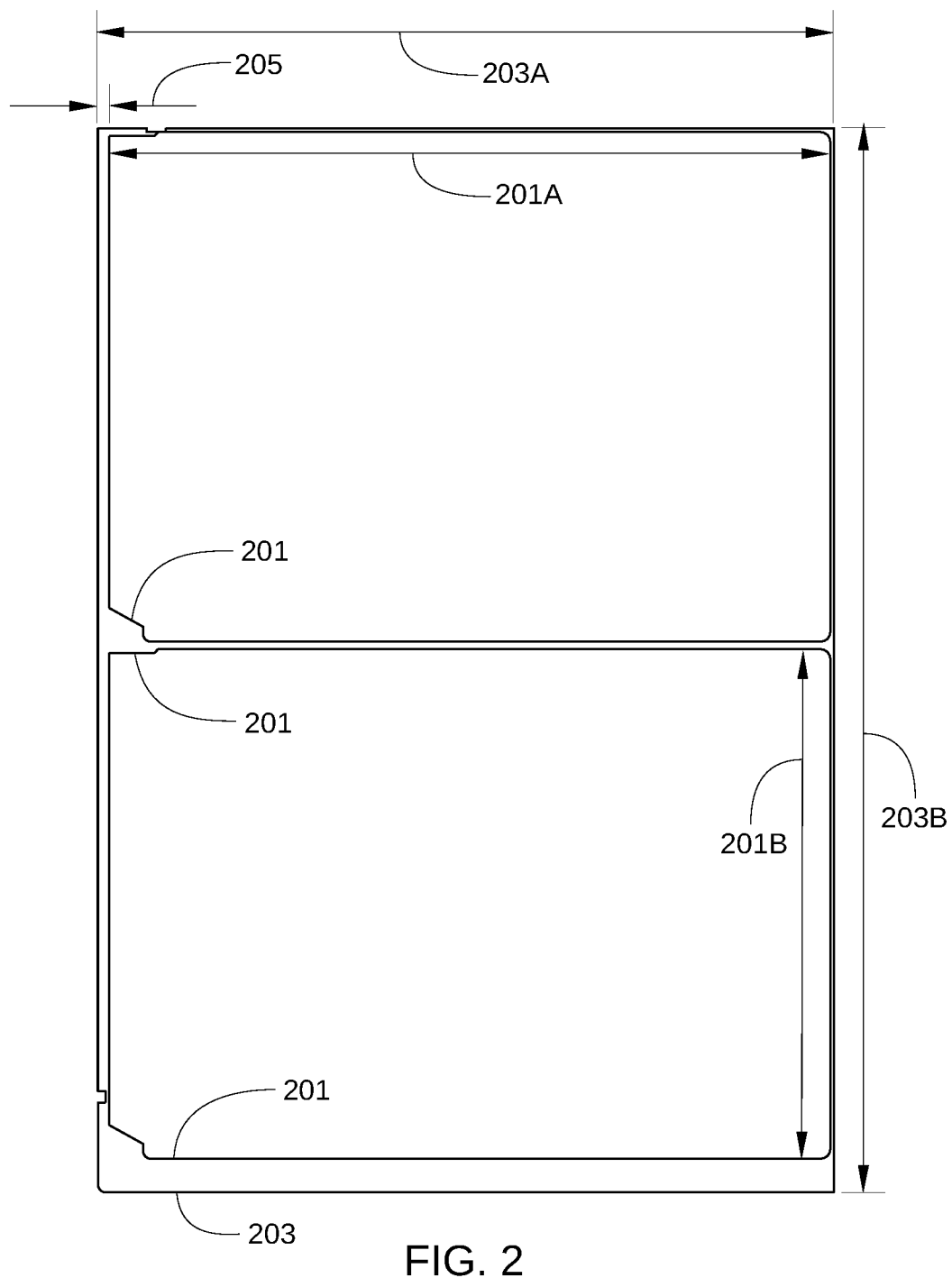
FIG. 2 schematically illustrates a plan view of a footprint of two 2.5-inch form factor drives superimposed onto a footprint of a support structure, according to one or more embodiments.

FIG. 2 schematically illustrates a plan view of a footprint 201 of two 2.5-inch form factor HDDs superimposed onto a footprint 203 of, for example, support structure 103 of FIG. 1. Footprint 201 conforms to the 2.5-inch form factor specification for HDDs (the so-called SFF-8201), and therefore has a length 201A up to about 100.45 mm and a width 201B of up to about 70.1 mm. Footprint 203 conforms to the 3.5-inch form factor specification for HDDs (SFF-8301), and therefore has a width 203A no less than about 101.35 mm and a length 203B no less than about 147.0 mm. Thus, width 203A of support structure 103 can accommodate length 201A of a 2.5-inch form factor HDD and length 203B of support structure 103 can accommodate the width 201B of two 2.5-inch form factor HDDs, as shown in FIG. 1, albeit with very little clearance 205. Clearance 205 indicates the available space for a SATA connector (e.g., electrical connector 120 of FIG. 1) to extend outside of SATA receptacle 121 or SATA receptacle 122 when coupled thereto. In the embodiment illustrated in FIGS. 1 and 2, based on the 2.5-inch form factor specification for HDDs and the 3.5-inch form factor specification for HDDs, clearance 205 on one end of footprints 201 is generally between about 0.9 mm and about 1.4 mm (with substantially negligible clearance on an opposite end of footprints 201). A conventional SATA connector extends significantly more than 1.4 mm outside of a SATA receptacle when coupled thereto, as shown in FIG. 3.

Figure 3:
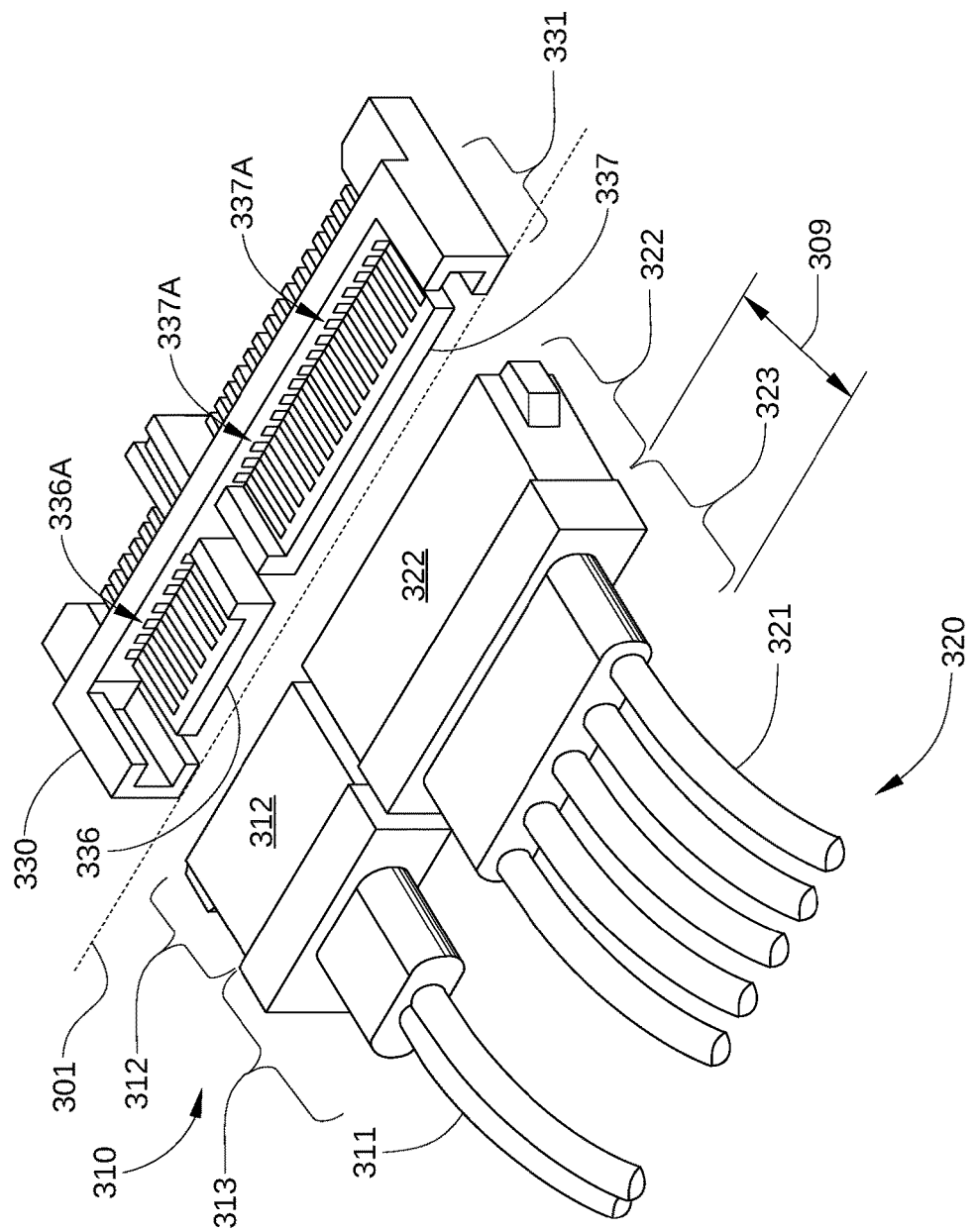
FIG. 3 is an isometric view of a conventional cable-end signal connector and a conventional cable-end power connector, both positioned proximate a device-mounted SATA connector.

FIG. 3 is an isometric view of a conventional cable-end signal connector 310 (sometimes referred to as a female SATA signal connector) and a conventional cable-end power connector 320 (sometimes referred to as a female SATA power connector), both positioned proximate a device-mounted SATA connector 330 (sometimes referred to as a male SATA connector). Cable-end signal connector 310 is disposed on an end of a SATA signal cable 311, cable-end power connector 320 is disposed on and end of one or more power cables 321, and device-mounted SATA connector 330 may be mounted on a surface of a mass storage device, such as first HDD 101 or second HDD 102 of FIG. 1. Device-mounted SATA connector 330 includes an L-shaped insertion tab 336 with signal contacts 336A formed thereon and an L-shaped insertion tab 337 with power contacts 337A formed thereon. For clarity, the mass storage device associated with device-mounted SATA connector 330 is omitted from FIG. 3, but for reference a footprint 301 of such a device is included in FIG. 3. Footprint 301 may correspond to a portion of either of footprints 201 in FIG. 2.

When cable-end signal connector 310 is coupled to device-mounted SATA connector 330, an inserted portion 312 of cable-end signal connector 310 overlaps with a receptacle portion 331 of device-mounted SATA connector 330. Similarly, when cable-end power connector 320 is coupled to device-mounted SATA connector 330, an inserted portion 322 of cable-end power connector 320 overlaps with receptacle portion 331 of device-mounted SATA connector 330. It is noted that inserted portion 312 and inserted portion 322 do not extend beyond device-mounted SATA connector 330 or footprint 301 when coupled to device-mounted SATA connector 330. However, remaining portion 313 of cable-end signal connector 310 and remaining portion 323 of cable-end power connector 320 do extend a significant distance 309 beyond footprint 301, for example on the order of five to ten millimeters or more. Because distance 309 is much larger than clearance 205 (shown in FIG. 2), there is insufficient space in mass storage device 100 for cable-end signal connector 310 and cable-end power connector 320. Consequently, cable-end signal connector 310 and cable-end power connector 320 cannot be used to couple signal or power cables to, for example, first HDD 101 or second HDD 102 of FIG. 1 without increasing the size of mass storage device 100 beyond the footprint of support structure 103.

According to one or more embodiments, electrical connector 120 of FIG. 1 may be configured so that, when coupled to device-mounted SATA connector 330 of FIG. 3, electrical connector 120 does not extend significantly beyond footprint 301 of the electronic device associated with device-mounted SATA connector 330 and does not increase the thickness of the electronic device. In such embodiments, electrical connector 120 may include conductive pins that exit a side of electrical connector 120 that faces device-mounted SATA connector 330. Alternatively or additionally, electrical connector 120 might not include any conductors, such as conductive pins or wires, that exit electrical connector 120 on a side opposite the side of electrical connector 120 that faces device-mounted SATA connector 330. These features allow power and/or signal conductors exiting electrical connector 120 to be routed in a direction that does not increase the effective size of the electronic device to which electrical connector 120 is coupled. Thus, electrical connector 120, when coupled to device-mounted SATA connector 330, does not significantly extend beyond the footprint of the electronic device or otherwise increase the size of the electronic device.

Figure 4A:
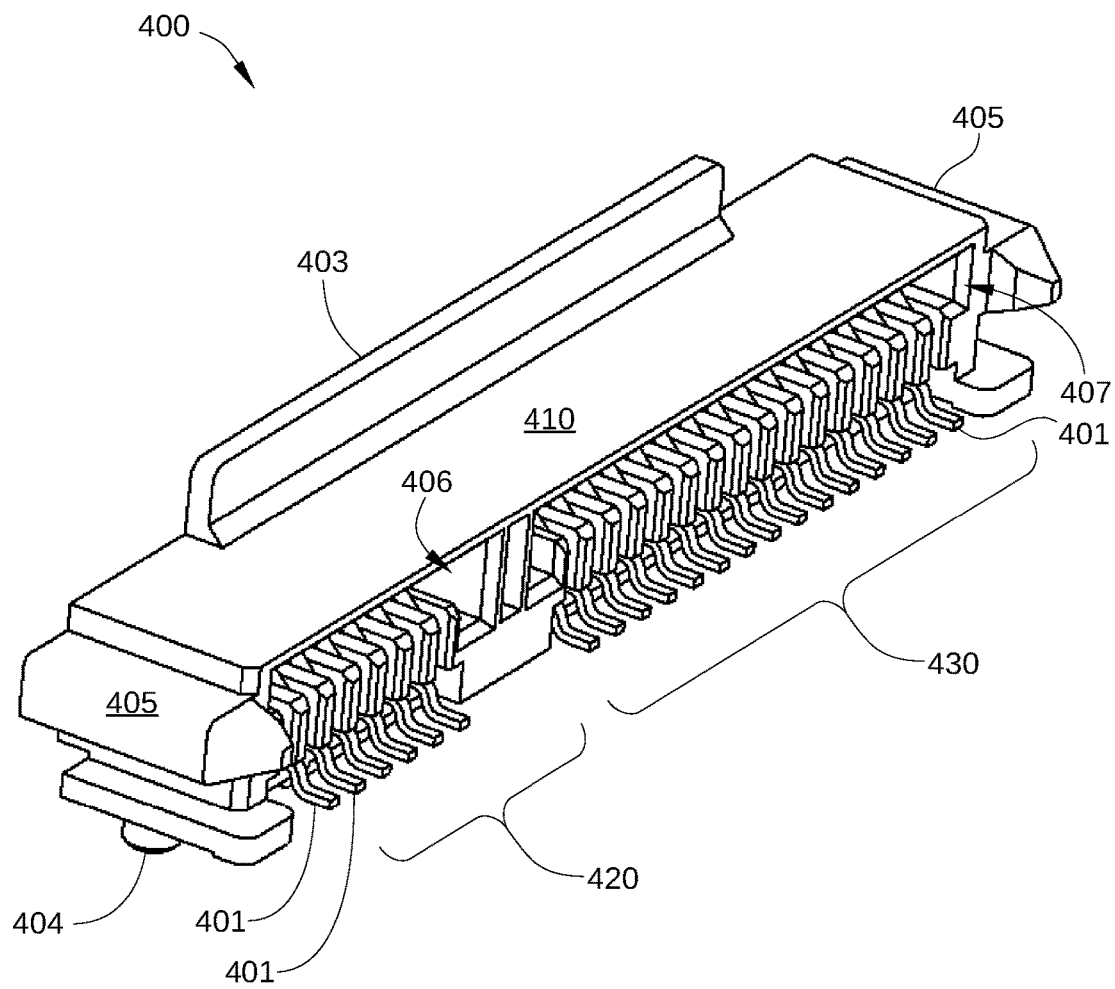
FIG. 4A is an isometric view of a SATA connector, configured according to one or more embodiments.
Figure 4B:
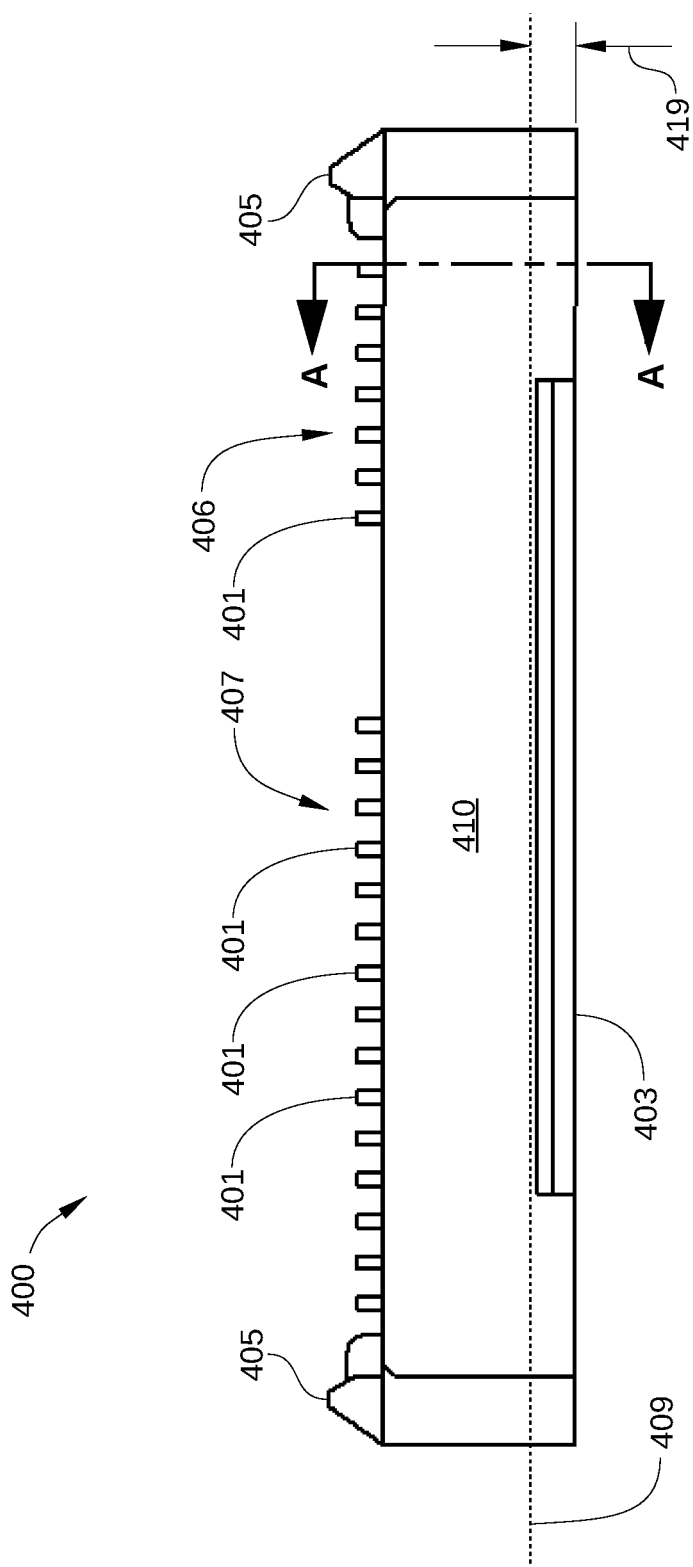
FIG. 4B is a plan view of SATA connector and, for reference, a footprint of a mass storage device, according to one or more embodiments.

FIG. 4A is an isometric view of a SATA connector 400, configured according to an embodiment. FIG. 4B is a plan view of SATA connector 400 and, for reference, a footprint 409 of a mass storage device. Footprint 409 indicates the relative positions of the mass storage device and SATA connector 400 when SATA connector 400 is coupled thereto. SATA connector 400 is configured to mate with a device-mounted SATA connector, such as device-mounted SATA connector 330 in FIG. 3. Thus, SATA connector 400 includes the functionality of both cable-end signal connector 310 and cable-end power connector 320 in FIG. 3, and may be employed to relay power and data signals to a mass storage device associated with the device-mounted SATA connector. SATA connector 400 includes a body 410 configured with a signal portion 420 and a power portion 430, and a plurality of spring contacts 401 disposed in both the signal portion 410 and the power portion 420. Body 410 may include an extraction feature 403 formed on at least one surface of body 410, an extraction feature 404 formed on a different surface of body 410, alignment tabs 405, a data-side keyed opening 406, and a power-side keyed opening 407.

Extraction feature 403 is a ridge or other protrusion configured as an extraction feature to facilitate removal of SATA connector 400 from a device-mounted SATA connector. For example, in such embodiments, extraction feature 403 provides a positive surface on which outward pressure can be exerted when removing SATA connector 400 for a device-mounted SATA connector.

Extraction feature 404 may be a ridge or other protrusion that projects from a different surface of body 410 than extraction feature 403. Similar to extraction feature 403, extraction feature 404 is configured to facilitate removal of SATA connector 400 from a device-mounted SATA connector by providing a positive surface on which outward pressure can be exerted when removing SATA connector 400 from a device-mounted SATA connector. In some embodiments, extraction feature 404 is disposed on a surface of body 410 that is opposite the side of body 410 on which extraction feature 403 is disposed.

Alignment tabs 405 are located on opposite sides of body 410 and are configured to mate with corresponding alignment slots on a device-mounted SATA connector. An example of such alignment slots are visible in FIG. 3, on opposing ends of device-mounted SATA connector 330. Similarly, data-side keyed opening 406 is configured to mate with a corresponding L-shaped insertion tab on a device-mounted SATA connector (such as L-shaped insertion tab 336 in FIG. 3), and power-side keyed opening 407 is configured to mate with a corresponding L-shaped insertion tab on a device-mounted SATA connector (such as L-shaped insertion tab 336 in FIG. 3). It is noted that the power and signal contacts formed on the above-described L-shaped insertion tabs make electrical contact with respective spring contacts 401 of body 410 when SATA connector 400 is coupled to device-mounted SATA connector 330.

As shown in FIG. 4B, SATA connector 400 extends outside footprint 409 for a distance 419 equal to a thickness of extraction feature 403. Because extraction feature 403 can be configured to be as thin as 1 mm or less, the coupling of SATA connector 400 to a mass storage device does not significantly increase the effective size of the mass storage device. Thus, SATA connector 400 may be employed to connect first HDD 101 and second HDD 102 in FIG. 1 to a PCB or other electronic device contained in mass storage device 100 without extending beyond footprint 203 of support structure 103. In some embodiments, SATA connector 400 may be configured without extraction feature 403. In such embodiments, SATA connector 400 does not extend outside footprint 409 at all, and can be decoupled from a mass storage device using extraction feature 404.

Spring contacts 401 of SATA connector 400 are conductive elements, such as metallic wires or pins, that are configured to electrically couple to respective contacts in a mating connector, such as signal contacts 336A and power contacts 337A of device-mounted SATA connector 330 in FIG. 3. In addition, spring contacts 401 are routed in SATA connector 400 to exit SATA connector 400 on a different side than the side of SATA connector 400 opposite the mating connector. One such embodiment of spring contacts 401 is illustrated in FIG. 5.

Figure 5A:
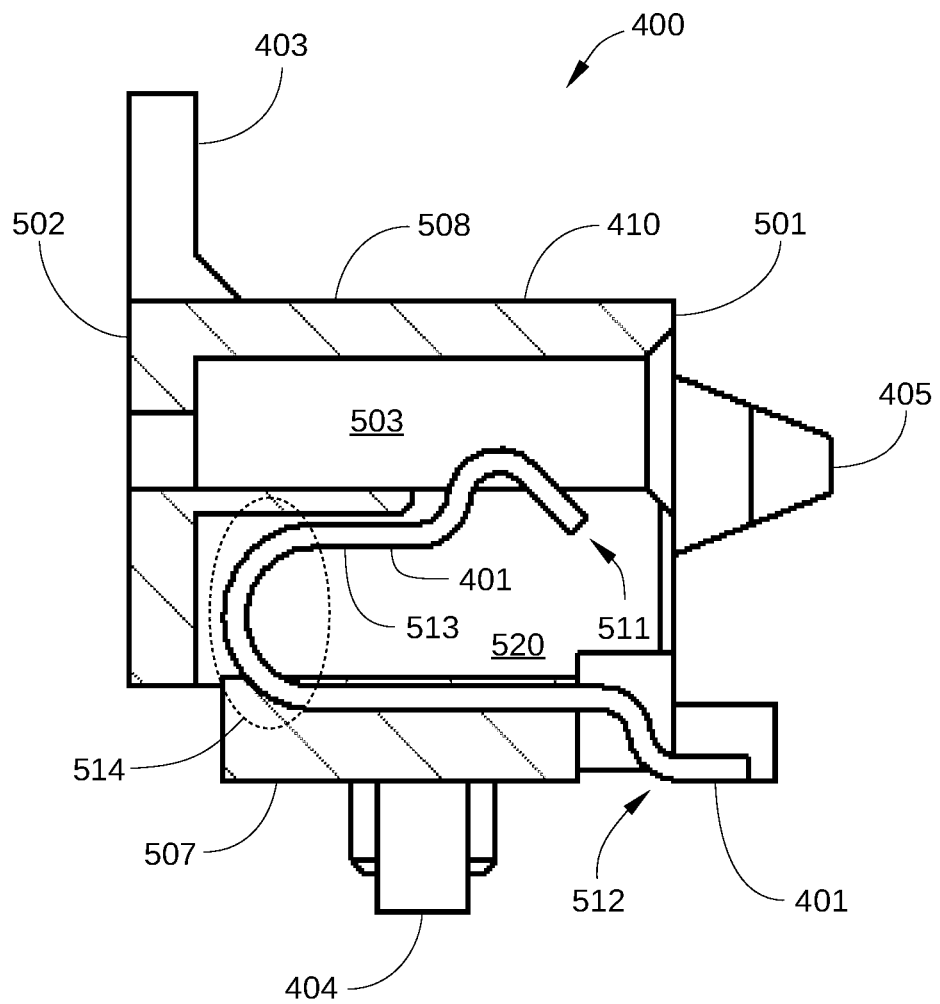
FIG. 5A is a cross-sectional view of the SATA connector illustrated in FIGS. 4A and 4B, taken at section A-A in FIG. 4B, showing a spring contact configured according to a first embodiment.

FIG. 5A is a cross-sectional view of SATA connector 400, taken at section A-A of FIG. 4B, showing spring contact 401 configured according to a first embodiment. In addition to spring contact 401, extraction feature 403, extraction feature 404, and alignment tabs 405, SATA connector 400 includes a first side 501, a second side 502, and a connector receptacle 503, into which spring contact 401 extends as shown.

First side 501 is the insertion side of SATA connector 400, i.e., the side of SATA connector 400 that faces toward a mating connector, such as device-mounted SATA connector 330 in FIG. 3. Second side 502 is the external side of SATA connector 400, i.e., a side of SATA connector 400 that is opposite the insertion side of SATA connector 400. In addition, second side 502 may be the largest and/or only surface exposed when SATA connector 400 is coupled to a mating connector.

Connector receptacle 503 is configured to be compatible with an L-shaped insertion tab, such as L-shaped insertion tab 336 or L-shaped insertion tab 337 in FIG. 3. Thus, at section A-A, which is disposed in signal portion 420 of SATA connector 400, connector receptacle 503 corresponds to data-side keyed opening 406, and is configured to accommodate L-shaped insertion tab 336. In power portion 430 of SATA connector 400, connector receptacle 503 corresponds to power-side keyed opening 407, and is configured to accommodate L-shaped insertion tab 337.

In the embodiment illustrated in FIG. 5A, spring contact 401 includes a first end 511, a second end 512, and a body portion 513 connecting first end 511 and second end 512. As shown, at least a portion of first end 511 of spring contact 401 is disposed in connector receptacle 503, so that when an L-shaped insertion tab of a mating SATA connector enters connector receptacle 503, a portion of first end 511 electrically contacts a corresponding flat contact disposed on the L-shaped insertion tab. In one or more embodiments, some or all of body portion 513 of spring contact 401 may be disposed in an alignment slot 520 of SATA connector 400, so that spring contact 401 is accurately positioned with respect to the corresponding flat contact disposed on the L-shaped insertion tab.

As noted previously, spring contact 401 is routed to exit SATA connector 400 on a different side than the external side of SATA (i.e., different than second side 502, which is the side of SATA connector 400 opposite first side 501). Thus, according to some embodiments, spring contact 401 exits SATA connector 400 through second side 502, side 507, or side 508. In other words, second end 512 terminates at a point that is either between first side 501 and second side 502, or at a point that is closer to second side 502 than to first side 501. When the spring contacts 401 of SATA connector 400 are routed in this way, SATA connector 400 does not significantly extend beyond the footprint of an electronic device or otherwise increase the size of the device when coupled thereto, since spring contacts 401 or other conductors do not exit second side 502. In the embodiment illustrated in FIG. 5A, second end 512 terminates SATA connector 400 at a point proximate the intersection of second side 502 and side 507.

Figure 5B:
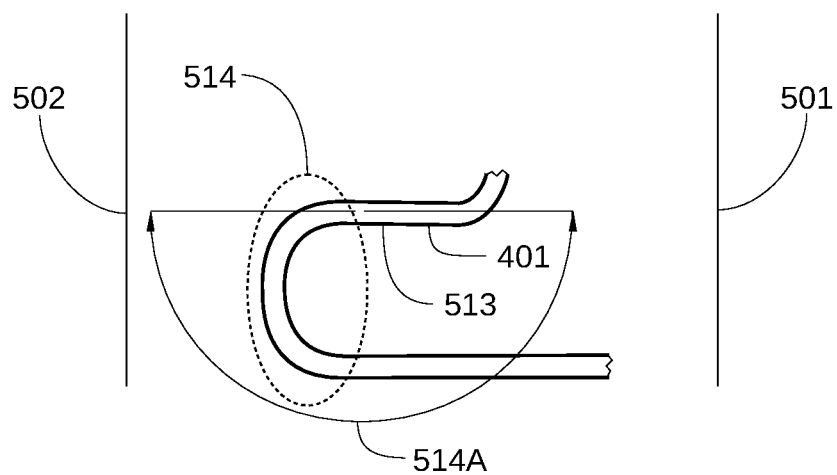
FIG. 5B is a cross-sectional view of a bent segment of a spring contact, configured according to the first embodiment.

Body portion 513 electrically connects first end 511 and second end 512. In addition, body portion 513 may be configured to generate a spring force against a flat contact of an L-shaped insertion tab when the L-shaped insertion tab is inserted into connector receptacle 503 and first end 511 is displaced. In this way, robust electrical contact is maintained between first end 511 and a corresponding flat contact disposed on an L-shaped insertion tab inserted into connector receptacle 503. In such embodiments, body portion 513 may include a bent segment 514, as shown in FIG. 5A. Bent segment 514 may include a bend of at about 180 degrees, so that body portion 513 is routed away from second side 502 and so that body portion 513 can generate a robust spring force that resists first end 511 being displaced. One such embodiment is illustrated in FIG. 5B. FIG. 5B is a cross-sectional view of bent segment 514 of spring contact 401, configured according to the first embodiment. As shown, bent segment 514 is bent at an angle 514A of about 180 degrees, so that body portion 513 is routed away from second side 502 and toward first side 501.

In some embodiments, bent segment 514 includes a 180 degree bend and therefore is substantially u-shaped. In such embodiments, body portion 513 is routed directly away from second side 502 of SATA connector 400. In other embodiments, bent segment 514 includes a bend between about 90 degrees and 180 degrees, so that spring contact 401 is routed toward side 507 rather than toward first side 501. One such embodiment is illustrated in FIG. 6.

Figure 6:
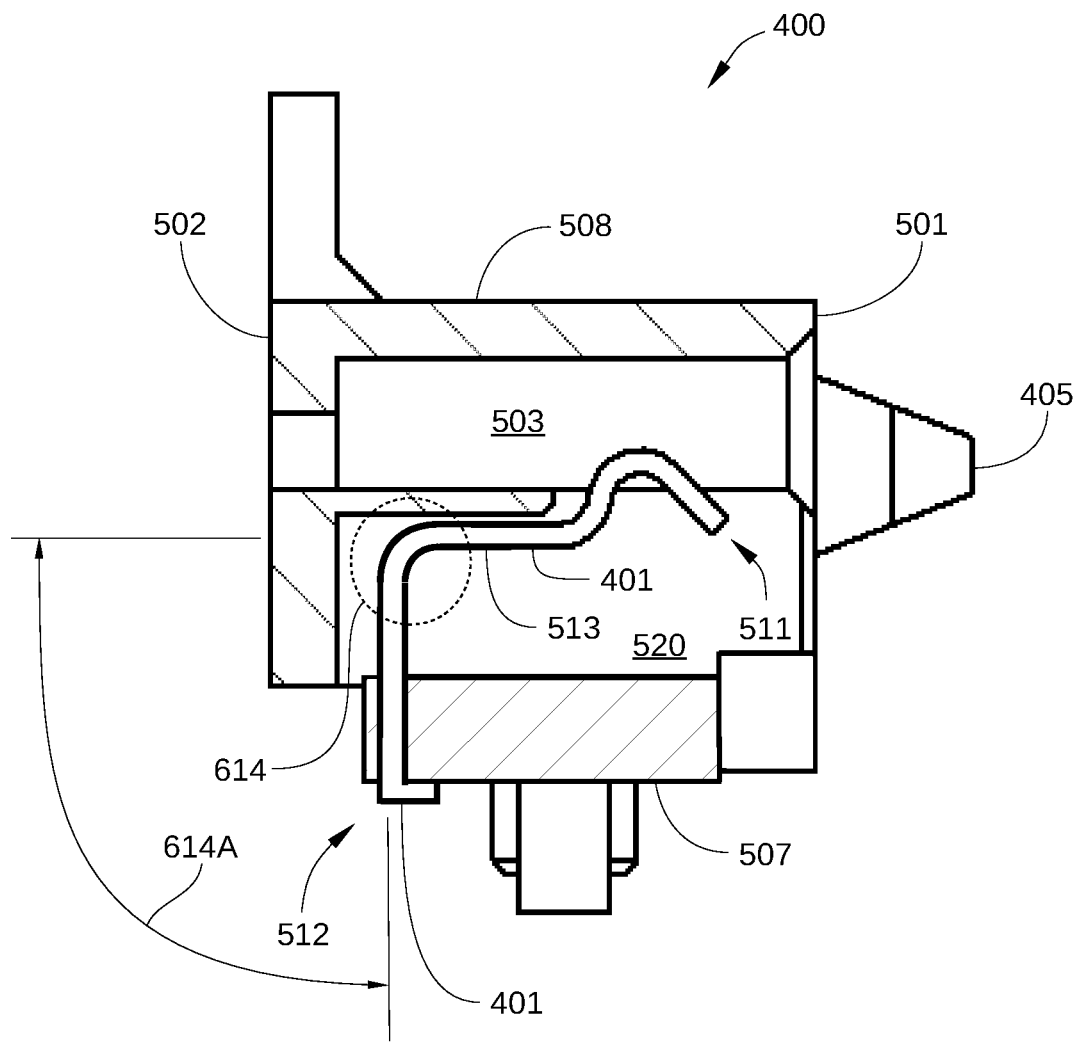
FIG. 6 is a cross-sectional view of the SATA connector illustrated in FIGS. 4A and 4B, taken at section A-A in FIG. 4B, showing a spring contact configured according to one or more embodiments.

FIG. 6 is a cross-sectional view of SATA connector 400, taken at section A-A in FIG. 4B, showing spring contact 401 configured according to a second embodiment. According to the second embodiment, a bent segment 614 includes a bend having an angle 614A between about 90 degrees and 180 degrees. In the embodiment illustrated in FIG. 6, angle 614A is approximately 90 degrees. Consequently, spring contact 401 is routed toward side 507 rather than toward first side 501 as shown in FIG. 5.

In the embodiments described above, a SATA connector combines the functionality of a SATA power connector and a SATA signal connector into a single SATA connector. In other embodiments, a SATA signal connector and a separate SATA power connector may each be configured with the above-described features of SATA connector 400, including spring contacts 401, extraction feature 403, and extraction feature 404. In such embodiments, neither the SATA signal connector nor the separate SATA power connector significantly increases the effective size of the mass storage device coupled thereto, and can therefore be employed in mass storage device 100 of FIG. 1 in lieu of SATA connector 400.

Figure 7:
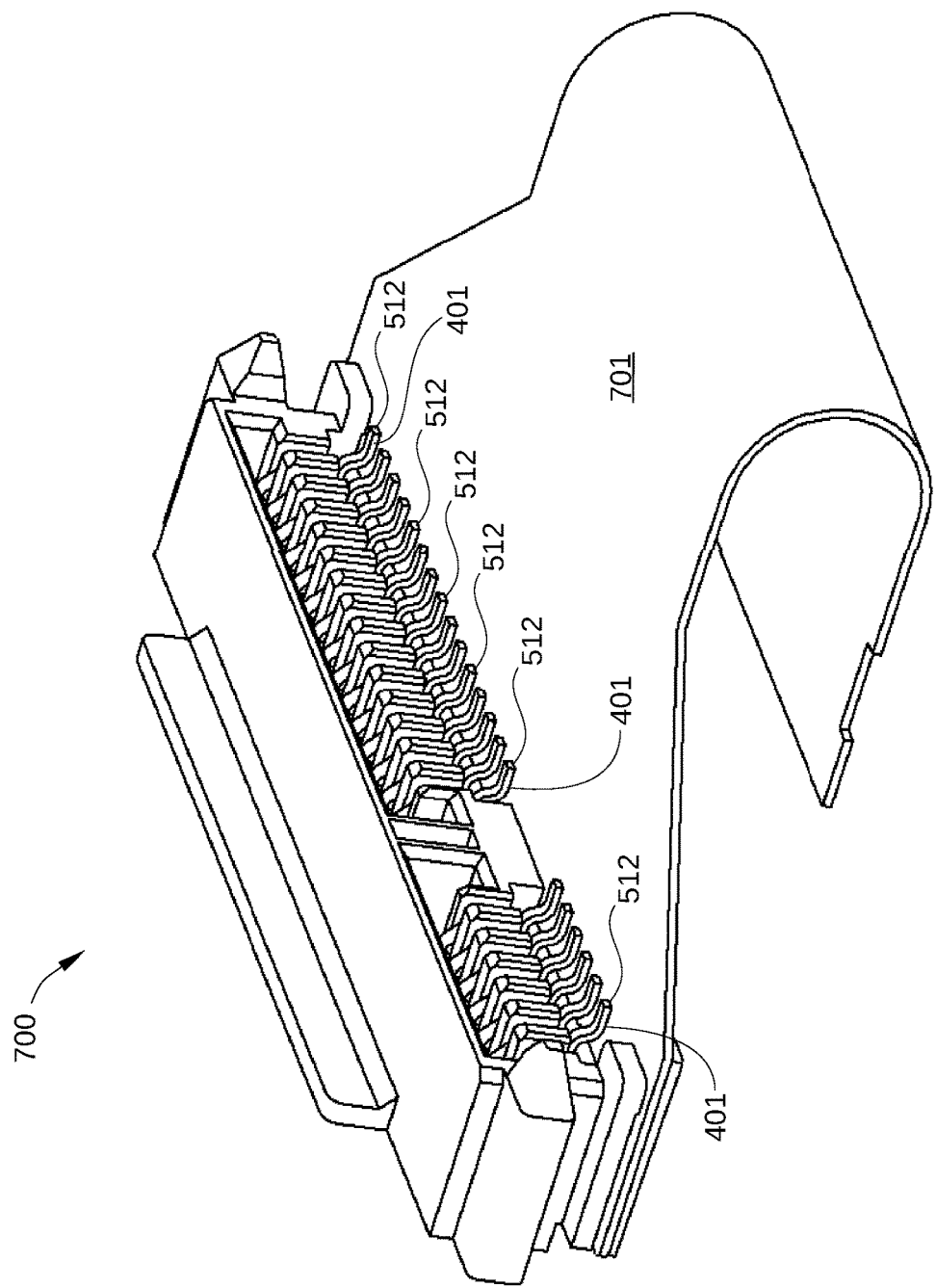
FIG. 7 is an isometric view of a SATA connector coupled to a flexible cable, configured according to one or more embodiments.

In some embodiments, second end 512 may be configured to be coupled to another conductive pin, wire or cable. For example, in some embodiments, second end 512 may be welded, soldered, or otherwise electrically coupled to a conductor of a flexible cable. One such embodiment is illustrated in FIG. 7. FIG. 7 is an isometric view of a SATA connector 700 coupled to a flexible cable 701, configured according to an embodiment. As shown, second ends 512 of spring contacts 401 are each electrically coupled to respective conductors of flexible cable 701. By providing at least limited range of motion to SATA connector 700, flexible cable 701 facilitates removal and insertion of SATA connector 700 into a device-mounted SATA connector, such as device-mounted SATA connector 330 in FIG. 3.

While the foregoing is directed to embodiments of the present invention, other and further embodiments of the invention may be devised without departing from the basic scope thereof, and the scope thereof is determined by the claims that follow.

We claim:

1. A SATA connector comprising: a connector body having a first receptacle formed therein to accommodate at least a portion of a mating SATA connector and a second receptacle; a plurality of elongated conductors positioned partially within the second receptacle, each having a first end extending partially out of the second receptacle and into the first receptacle for connection with a corresponding contact of the mating SATA connector, a second end that extends out of the connector body for connection with an external conductor, and a body portion connecting the first end and the second end, wherein the body portion has a U-shaped bend of at least about 180 degrees at a distal end of the elongated conductor in an insertion direction of the mating SATA connector and said U-shaped bend is located completely within the second receptacle.

2. The SATA connector of claim 1, wherein the body portion is configured to generate a spring force when the first end is displaced by the corresponding contact of the mating SATA connector.

3. The SATA connector of claim 2, wherein the external conductor comprises a conductor of a flexible cable.

4. The SATA connector of claim 2, wherein the body portion is configured to extend from a mating SATA connector no more than about 1.4 mm when coupled to the mating SATA connector.

5. The SATA connector of claim 2, wherein each of the plurality of elongated conductors comprises a spring contact.

6. The SATA connector of claim 2, wherein the second receptacle has a distal wall in the insertion direction of the mating SATA connector and a distal end of the U-shaped bend in the insertion direction of the mating SATA connector is spaced from and does not contact the distal wall.

7. A SATA connector comprising: a connector body having a first receptacle formed therein to accommodate at least a portion of a mating SATA connector and a second receptacle; a first side that comprises a side of the SATA connector that faces the mating SATA connector when the SATA connector is coupled to the mating SATA connector; a second side that is opposite the first side; and a plurality of elongated conductors positioned partially within the second receptacle, each having a first end disposed between the first and second sides and extending partially out of the second receptacle and into the first receptacle, a second end that extends out of the connector body for connection with an external conductor and terminating at a point that is between the first and second sides or is closer to the first side than to the second side, and a body portion connecting the first end and the second end, wherein the body portion has a U-shaped bend of at least about 180 degrees at a distal end of the elongated conductor in an insertion direction of the mating SATA connector and said U-shaped bend is located completely within the second receptacle.

8. The SATA connector of claim 7, wherein the body portion is configured to generate a spring force when the first end is displaced by the corresponding contact of the mating SATA connector.

9. The SATA connector of claim 7, wherein the external conductor comprises a conductor of a flexible cable.

10. The SATA connector of claim 7, wherein the first receptacle comprises a keyed opening for a SATA connector.

11. The SATA connector of claim 7, wherein the first end is configured to connect with the corresponding contact of the mating SATA connector.

12. The SATA connector of claim 7, wherein the second receptacle has a distal wall in the insertion direction of the mating SATA connector and a distal end of the U-shaped bend in the insertion direction of the mating SATA connector is spaced from and does not contact the distal wall.

* * * * *